US006365077B1

(12) United States Patent
Pott et al.

(10) Patent No.: US 6,365,077 B1
(45) Date of Patent: Apr. 2, 2002

(54) PROCESS FOR PREPARING CELLULOSIC COMPOSITES

(75) Inventors: Gerard Tjarko Pott, Zuiderwoude; Hendrik A. C. Groeneveld, Haarzuilens; Franciscus Hillebrand Adriaan Zomers, deceased, late of Wageningen; by Adriaan Norbertus Zomers, heir; by Geeske Martha Wip, heiress, both of Hardegarijp; by Marianne Geeske Zomers, heiress, Westdorpe; by Karin Margrieta Zomers, heiress, Bergum, all of (NL)

(73) Assignee: CR&DO B.V. (NL)

( * ) Notice: Subject to any disclaimer, the term of this patent is extended or adjusted under 35 U.S.C. 154(b) by 0 days.

(21) Appl. No.: 09/066,231

(22) Filed: Apr. 24, 1998

(30) Foreign Application Priority Data

Apr. 25, 1997 (EP) ........................................... 97201249

(51) Int. Cl.[7] .......................... B29C 43/02; B29C 43/20

(52) U.S. Cl. ....................... 264/113; 264/319; 264/115; 264/122; 264/128

(58) Field of Search ................................ 264/113, 120, 264/128, 112, 115, 118, 319, 322, 122, 123

(56) References Cited

U.S. PATENT DOCUMENTS

| | | | | | |
|---|---|---|---|---|---|
| 3,868,300 A | * | 2/1975 | Wheeler | ..................... | 162/124 |
| 4,046,622 A | * | 9/1977 | Attwood et al. | ............ | 162/132 |
| 4,160,004 A | * | 7/1979 | Curry et al. | ................ | 264/120 |
| 4,290,988 A | * | 9/1981 | Nopper et al. | .............. | 264/112 |
| 4,397,100 A | | 8/1983 | Dickey et al. | | |
| 5,028,286 A | | 7/1991 | Hsu | | |
| 5,451,361 A | * | 9/1995 | Ruyter et al. | ............... | 264/322 |
| 5,663,221 A | * | 9/1997 | Barcas | ........................ | 524/15 |

FOREIGN PATENT DOCUMENTS

| | | |
|---|---|---|
| EP | 0 161 766 | 11/1985 |
| EP | PCT/SE88/00006 | 1/1988 |
| EP | 0 373 726 | 6/1990 |
| EP | 0 494 016 | 7/1992 |
| EP | 0 608 949 A1 | 1/1994 |
| EP | 0 608 949 | 8/1994 |
| EP | 0 373 726 A2 | 12/1998 |
| GB | 959375 | 8/1960 |
| SU | 1027050 | 7/1983 |

OTHER PUBLICATIONS

Derwent Publications Ltd, London, Jul. 1983; Section Ch, Week 8415 (Wood Prod Ind Res).

* cited by examiner

*Primary Examiner*—Angela Ortiz
(74) *Attorney, Agent, or Firm*—Akerman Senterfitt

(57) ABSTRACT

A process for the preparation of cellulosic composites from divided cellulosic fibrous material, which process comprises a hydrothermolytic treatment of the divided cellulosic fibrous material, carried out at a temperature in the range of 160 to 200° C., using water as softening agent, a drying or a drying and a curing step and a step in which dried or dried and cured particles of treated material are contacted with an adhesive, subsequently curing the adhesive-laden particles at increased temperature and pressure under formation of the desired composite.

17 Claims, No Drawings

PROCESS FOR PREPARING CELLULOSIC COMPOSITES

BACKGROUND OF THE INVENTION

The invention relates to a process for the preparation of cellulosic composites, in particular panel boards, starting from divided cellulosic fibrous material.

The invention further relates to the panel boards, obtained in the above process.

In industry, in particular in the building and construction industry, cellulosic composites, such as panels for doors, partitions and wall-segments, moulded pieces for furniture and larger parts for prefabricated structures, to be incorporated in houses, bungalows, barns and the like, are in ever increasing demand.

Depending on their properties, the composites will be applied indoors or for exterior use. Of paramount importance in this respect, especially for external applications, is the moisture sensitivity of the composite products, affecting the dimensional stability, the mechanical strength and the (biological) durability.

These properties and the like are affected both by the selection of the cellulosic fibrous starting material and by the selected manufacturing process.

Conventional starting materials for preparing cellulosic composites include wood and other lignocellulosic fibres. Wood and wood based fibres are widely used for the manufacture of panel boards, like particle boards and hardboard, respectively. In most of these manufacturing processes, the starting material is first reduced in size, e.g. shredded to chips, wafers or shavings. This implies that as a rule there is no real shortage in feedstock supply, as residual rest wood and roundwood and small-size residues are available from many other wood or fibre related processes and, instead of being wasted, can be conveniently used as starting materials in the manufacture of panel boards. The further processing of the starting material is known to be performed in the presence or absence of bonding agents.

In the patent and non-patent literature the manufacture of panel boards like particle board and fibreboard has been extensively described.

Thus, "Modern Particleboard & Dry-process Fiberboard Manufacturing" by Thomas M. Moloney, 1977, provides a detailed survey of commercial and semicommercial processes, indicating the many efforts made to simplify and economize the process and the measures taken to improve the properties of the final products.

In GB 959.375 a typical process is disclosed for the production of hardboard, fibreboard or the like comprising shredding rubber wood, treating the shredded wood with boiling water or steam to yield a fibrous pulp and compressing the pulp into the required board.

Another process based on the aggregation of very small pieces of wood, without the addition of a bonding agent is described in EP-A-161766. The process comprises treating the lignocellulosic material in divided form with steam to heat the material to a temperature high enough to release hemicellulose but not exceeding the temperature of carbonisation, for a time sufficient to decompose and hydrolyse hemicellulose into free sugars, sugar polymers, dehydrated carbohydrates, furfural product and other decomposition products: forming the treated lignocellulosic material into a mat and pressing the mat at a temperature not exceeding the temperature at which the mat would char, at a pressure and for a time sufficient to transform and thermoset the free sugars, sugar polymers, dehydrated carbohydrates, furfual products and other decomposition products in the lignocellulose materials into a polymeric substance which adhesively bonds together the lignocellulosic material to yield the reconstituted composite product.

Whereas the operability of the said process in the absence of adhesives in theory would appear cost-beneficial, the document makes clear that the decomposition of the hemicellulose portion of the lignocellulosic material typically proceeds at severe conditions, using high pressure steam and temperatures often in the range of 210 to 280° C. The conditions preferred during the final pressing or moulding step are likewise relatively severe. Moreover, changes in the composition of the starting material will have an impact on the thermosetting during the hot pressing step, so that frequent adjustment of the conditions will be necessary.

Investigation of the products obtained in the process known from EP-A-161766, has shown that their properties, although allegedly fulfilling Canadian requirements for external use, are by no means optimal, so that relatively early replacement of products exposed to severe outdoor conditions has to be taken into account.

It has now been found that by adding a suitable bonding agent after the thermohydrolytic treatment, even when this is performed at less severe conditions than in the process from the aforesaid EP document, products with superior properties are obtained, in particular as regards dimensional stability, mechanical strength and (biological) durability.

SUMMARY OF THE INVENTION

The invention may be defined as relating to a process for the preparation of cellulosic composites from divided cellulosic fibrous material, which process comprises a hydrothermolytic treatment of the divided cellulosic fibrous material, carried out at a temperature in the range of 160 to 200° C., using water as softening agent, a drying step, or a drying and a curing step, and a step in which dried, or dried and cured particles of treated material are contacted with an adhesive, subsequently curing the adhesive-laden particles at increased temperature and pressure under formation of the desired composite.

A preferred source of cellulosic fibrous material is formed by predominantly wood based material which is widely available, for example fresh roundwood and pieces of dried residual wood.

In practice, the cellulosic fibrous materials are sometimes already available in divided form, for example cuttings, shavings and chips, or the mixtures of shavings and sawdust resulting from commercial furniture manufacturing processes. However, the dimensions of these divided materials differ considerably. For example, the materials may consist of mixtures of particles with average dimensions ranging from 1 mm to 15 cm.

These materials, including roundwood and residual wood, must be divided according to the specific manufacturing process.

In the process of the present invention conveniently any of the divided starting materials normally used in the known commercial processes for the manufacture of particle board, fiber board, oriented strand board and the like can be applied.

According to a preferred embodiment of the present process, in particular suitable for the manufacture of oriented strand board, the divided starting material substantially consists of particles having a length of up to 15 cm, e.g. in the range of from 1 mm to 15 cm, a width of up to 5 cm, e.g. in the range of from 1 mm to 5 cm and a thickness of at most 3 mm, preferably of at most 2 mm.

According to another preferred embodiment of the process of the invention, in particular suitable for the manufacture of particle board, the divided starting material substantially consists of particles having a length in the range of from 1 to 12 mm, preferably in the range of from 1 to 10 mm and a diameter in the range of from 0.1 to 5 mm, preferably in the range of from 0.2 to 4 mm.

In order to prepare the starting material for the process of the invention, conventional techniques known in the art may be used such as milling or shredding methods. Thus, raw materials may be segregated by type of material, size and moisture content. They may be stored, or directly transported to the production unit.

The milling or shredding is performed according to any of the conventional techniques known in the art. For example, the milling can be carried out in the presence of steam. Presoftening the material under pressure may be beneficial for converting the raw material into divided materials e.g. particles or fibres.

According to the process of the present invention, the divided material is subjected to a hydrothermolytic treatment under specific conditions. In this treatment the starting material is contacted with an aqueous softening agent at a temperature in the range of 160 to 200° C., using water as softening agent and at a pressure of at least the equilibrium vapour pressure of the softening agent at the operating temperature. During this treatment a break-down of at least part of the hemicellulose and lignin, present in the starting material, occurs by means of disproportionation and hydrolysis reactions. Although not wishing to be bound by theory, it is believed that the products of the said disproportionation and hydrolysis reactions, including substances as aldehydes and moieties containing phenolic groups, will undergo polymerization during the curing stage later in the process. As a result of these non-reversible reactions, products with a high dimensional stability and (biological) durability and excellent water resistance are obtained.

Whereas the hydrothermolytic treatment can be carried out at relatively high pressures more moderate pressure conditions are by far preferred. Thus, it has been established that the hydrothermolytic treatment is advantageously performed at a pressure in the range of from 5 to 15 bar. If desired, the hydrothermolytic treatment can be incorporated in the process at the stage whereby the cellulosic fibrous material is shredded, or divided into wafers or other particles, as discussed above. However, it is recommended to perform the hydrothermolytic treatment subsequently to that stage, i.e. directly after the preparation of the starting material in divided form. In this manner the optimal conditions for each of the said process stages can be independently adhered to. In addition there is no need for directly drying the wet particles from the dividing quently unit, as they will be contacted with the aqueous softening agent in the subsequent hydrothermolysis step. Furthermore an efficient use can be made of the heat required in the various stages of the process: advantageously at least part of the heat removed from the hydrothermolytic reaction unit can be utilized by means of heat-exchanging to supply heat to the particle dividing unit, or to heat-up a subsequent batch introduced into the hydrothermolytic reaction unit.

According to the invention, the treated particles are dried, or dried and cured. Drying is typically performed at a temperature between 50 and 100° C. Higher temperatures, e.g. up to 450° C., are feasible, provided the combustion temperature of the particles themselves is not reached. Drying is preferably continued until the remaining moisture content of the particles is at most 10% by weight. Lower moisture contents are likewise suitable, but do not offer special advantages in the optional subsequent curing stage. The curing of the dried particles is conveniently carried out at temperatures in the range of from 120 to 220° C., preferably in the range of from 140 to 200° C. in an oxygen-free or low-oxygen atmosphere. Most preferred curing temperatures are in the range of from 160 to 190° C. The optimal duration of the curing stage will depend on the nature of the particles and the curing temperature selected, but is usually between 1 and 4 hours.

Owing to e.g. incidental clogging and the method used for dividing the raw material, small amounts of larger particles may be present, whereas attrition may have caused the formation of some fines. If the presence of these larger and smaller particles is considered undesirable, the uniformity of the particles may be increased by sieving the particles, or by air-classification, for example in 2 or 3 fractions. In some instances, however, sieving, or air-classification of the dried or dried and cured particles can be omitted.

In some instances, for example if composites with different properties within a single composite are to be prepared, e.g. heavy panel boards with smooth surface areas, there may be benefit in using starting materials comprising particles of different sizes, such as mixtures of small chips and fines.

Subsequently, the dried or dried and cured particles or, as the case may be, the various fractions of particles, are contacted with a bonding agent, also referred to as adhesive.

In order to obtain adhesive-laden particles such that the particles will only become superficially covered by a thin layer of adhesive, any of the commercially available techniques may be used, one of which consists in admixing the particles or fractions of particles with preselected amounts of adhesive at ambiant temperature.

It is preferred to avoid the use of excess amounts of adhesive, because this will be at the expense of the economy of the process and it may result in a reduction of the mechanical strength of the cured products. Recommended amounts of adhesives are in the range of 4 to 25% by weight, depending on the size distribution and the surface area of the particles brought into contact with the adhesive. Preferred amounts for the manufacture of particle boards are in the range of 5 to 15%, in particular in the range of 5 to 10% on the same basis.

Suitable adhesives, in particular for external or wet applications of the composites, include resins such as phenol-formaldehyde, melamine-formaldehyde-, melamine-urea-formaldehyde-, resorcinol-,polyurethane- and epoxy-resin based systems, or combinations thereof, usually in liquid form, although powdered resins can also be used. Oligomeric ketones, e.g. oligomers of carbon monoxide and one or more olefins and furthermore natural resins such as tannin or lignin based adhesives are likewise suitable.

In the process of the invention the adhesive-laden particles are then deposited, advantageously by sprinkling, in a press or mould, usually in one or more layers. For example, if it is desired to prepare a particle board comprising a coarse central portion in between two smooth surface covering layers, it is recommended to prepare 3 successive layers in the press or mould: one consisting of adhesive-laden fine particles, one consisting of adhesive-laden larger wood-based particles and finally another adhesive-laden fine particles layer.

Also multi-layer systems can be prepared, e.g. with different to players for decorative purposes, or with different orientation, as in oriented strand board. Once arranged in the press or mould, the (final) curing step in the process of the invention comprises the thermosetting pressure treatment of the adhesive-laden particles. Suitable curing temperatures include those in the range of from 120 to 220° C., preferably in the range of from 140 to 200° C. and most preferably in the range of from 160 to 190° C. Normally, suitable decreasing pressure methods are used. Recommended pressures range in between 50 to 5 bar, preferably between 30 and 5 bar.

The cured products can be painted and polished as desired and further adjusted in size whenever required. The composite products obtained include wood and fibre based panel boards such as oriented strand board, high and low density particle boards and fibrous felted boards, e.g. hardboard and medium-density fiber board. The invention is further illustrated by the following non-limiting examples:

EXAMPLE 1

Experiments for producing plates were carried out with a mixture of round and recycle wood. This starting material, containing both softwood and hardwood, was obtained from a commercial particleboard production line.

In two experiments the wood particles, with a length of 1–12 mm and a diameter of 0.1–5 mm, were treated in a 16 liter autoclave under the pressure being in equilibrium with the vapour phase, with water for 15 minutes at a temperature of 165 and 185° C., respectively. The particles were then rapidly cooled. Subsequently, the particles thus treated were dried at 40° C. to a residual moisture content of less than 10and then cured at 170° C. for 4 hours. After sieving to remove particles smaller than 0.8 mm and conditioning, the particles were homogeneously sprayed with an amount of 13.5w by weight of liquid MUF (melamine-urea-formaldehyde resin) and then pressed at 185° C. for 144 seconds at an initial pressure of 40 bar to produce plates of 40×40×1.2 cm.

For comparison, a third experiment was carried out in which the particles were processed in the same manner, with the exception that they had not been subjected to a hydrothermolytic treatment.

The three products obtained in these experiments were tested with respect to the swell in water (20° C.) (NEN-EN 317), dry internal bond (IB dry) (NEN-EN 319), residual internal bond after boiling for 2 hours (IB wet)(NEN-EN 1087) and specific weight. The results of these tests are given below.

| swell in water | untreated | 165° C. | 185° C. |
|---|---|---|---|
| 2 hours, % | 4.5 | 3.4 | 1.9 |
| 24 hours, % | 8.0 | 6.8 | 4.2 |
| IB dry | 1.10 | 0.84 | 0.91 |
| spec.wt (kg/m$^3$) | 750 | 749 | 759 |
| IB wet | 0.24 | 0.41 | 0.43 |
| spec.wt (kg/m$^3$) | 749 | 753 | 763 |

The results obtained in the experiments according to the invention by far exceed the requirements for class V particleboards and loadboards for use in humid conditions (NEN-EN 312-5).

EXAMPLE 2

A number of experiments were carried out with mixtures of round and recycle wood, applying various hydrothermolytic conditions and using several different adhesives, including phenol formaldehyde, tannin based, MDI and MUF.

For comparison, experiments were performed in which no adhesives were used. In all cases the properties of the particleboards and loadboards for use in humid conditions were superior when an adhesive had been used.

What is claimed is:

1. A process for the preparation of cellulosic composites from divided cellulosic fibrous material, comprising the steps of:

hydrothermolytic treating of the cellulosic fibrous material divided in particles, substantially having a length of up to 15 cm at a temperature in the range of 160 to 200° C., using liquid water as softening agent, drying or drying and curing of the material contacting dried, or dried and cured particles of treated material with an adhesive, and subsequently curing the adhesive-laden particles at increased temperature and pressure under formation of the desired composite.

2. A process as claimed in claim 1, wherein the cellulosic fibrous material started from, predominantly consists of wood based material.

3. A process as claimed in claim 1, wherein the cellulosic fibrous material is divided in particles, substantially having a length of up to 15 cm, a width of up to 5 cm, and a thickness of at most 3 mm.

4. A process as claimed in claim 1, wherein the cellulosic fibrous material is divided in particles, substantially having a length in the range of from 1 to 12 mm and a diameter in the range of from 0.1 to 5 mm.

5. A process as claimed in claim 4, wherein the starting material substantially consists of particles having a length in the range of from 1 to 10 mm and a diameter in the range of from 0.2 to 4 mm.

6. A process as claimed in claim 1, wherein the hydrothermolytic treatment of the divided starting material consists in contacting the said material with an aqueous softening agent at a pressure in the range of 5 to 15 bar.

7. A process as claimed in claim 1, wherein the hydrothermolytic treatment is carried out subsequent to dividing the cellulosic fibrous material into particles.

8. A process as claimed in claim 1, wherein the particles obtained in the hydrothermolytic treatment are dried, such that their remaining moisture content is at most 10% by weight.

9. A process as claimed in claim 8, wherein the dried particles are subjected to a curing treatment at a temperature in the range of from 120 to 220° C.

10. A process as claimed in claim 9, wherein the curing treatment is carried out at a temperature in the range of 140–200° C.

11. A process as claimed in claim 10, wherein the curing treatment is carried out at a temperature in the range of 160 to 190° C.

12. A process as claimed in claim 1, wherein dried or dried and cured particles of hydrothermolytically treated material are contacted with an adhesive at ambient temperature.

13. A process as claimed in claim 1, wherein dried or dried and cured particles of the treated material, optionally after dividing into 2 or more fractions of different particle size, are contacted with an amount of adhesive in the range of 5 to 15% by weight depending on the size distribution of the particles.

14. A process as claimed in claim 1, wherein as adhesive use is made of a phenol-formaldehyde, or a tannin based resin.

15. A process as claimed in claim 1, wherein adhesive-laden particles arranged in one or more layers are cured at a pressure in the range of from 40 to 5 bar and at a temperature in the range of from 140 to 200° C.

16. A process as claimed in claim 3, wherein the thickness is at most 2 mm.

17. A process as claimed in claim 15, wherein the temperature is within the range of from 160°–190° C.

* * * * *